US011726501B2

(12) United States Patent
Koch

(10) Patent No.: US 11,726,501 B2
(45) Date of Patent: *Aug. 15, 2023

(54) SYSTEM AND METHOD FOR PERCEPTIVE NAVIGATION OF AUTOMATED VEHICLES

(71) Applicant: Automodality, Inc., Syracuse, NY (US)

(72) Inventor: Edward Lee Koch, San Rafael, CA (US)

(73) Assignee: AUTOMODALITY, INC., Syracuse, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 17/153,511

(22) Filed: Jan. 20, 2021

(65) Prior Publication Data

US 2021/0318696 A1 Oct. 14, 2021

Related U.S. Application Data

(63) Continuation of application No. 16/174,278, filed on Oct. 29, 2018, now Pat. No. 10,921,825.

(60) Provisional application No. 62/581,687, filed on Nov. 4, 2017.

(51) Int. Cl.
*G05D 1/10* (2006.01)
*B64C 39/02* (2023.01)
*G08G 5/00* (2006.01)

(52) U.S. Cl.
CPC .......... *G05D 1/101* (2013.01); *B64C 39/024* (2013.01); *G08G 5/0034* (2013.01); *B64U 2201/10* (2023.01); *B64U 2201/104* (2023.01)

(58) Field of Classification Search
CPC .... G05D 1/101; B64C 39/024; G08G 5/0034; B64U 2201/10; B64U 2201/104
See application file for complete search history.

(56) References Cited

U.S. PATENT DOCUMENTS

| | | | |
|---|---|---|---|
| 2017/0193830 A1 | 7/2017 | Fragoso et al. | |
| 2017/0329335 A1* | 11/2017 | DelMarco | G01C 21/005 |
| 2018/0246529 A1 | 8/2018 | Hu et al. | |
| 2019/0011921 A1 | 1/2019 | Wang et al. | |
| 2019/0050000 A1* | 2/2019 | Kennedy | G06V 20/17 |

* cited by examiner

*Primary Examiner* — Peter D Nolan
*Assistant Examiner* — Demetra R Smith-Stewart
(74) *Attorney, Agent, or Firm* — Kerr IP Group, LLC

(57) ABSTRACT

A navigation system and method for an autonomous vehicle (AV) that includes a system controller and an environmental sensor. The system controller determines a fixed local frame (LCF) having a coordinate system originating at a fixed location in three-dimensional space. Additionally, the system controller determines an AV positional pose in LCF coordinates, which identifies an AV position in three-dimensional space and an AV orientation in three-dimensional space. An environmental sensor detects an asset feature of an asset moving within three-dimensional space. The system controller then identifies an asset feature frame (AFF) having a coordinate system originating at the asset feature. A localization module determines the AV positional pose in the AFF coordinates. The system controller then dynamically transforms the AV position pose from the LCF coordinates to the AFF coordinates and generates a motion control command based on the AV positional pose in the AFF coordinates.

20 Claims, 13 Drawing Sheets

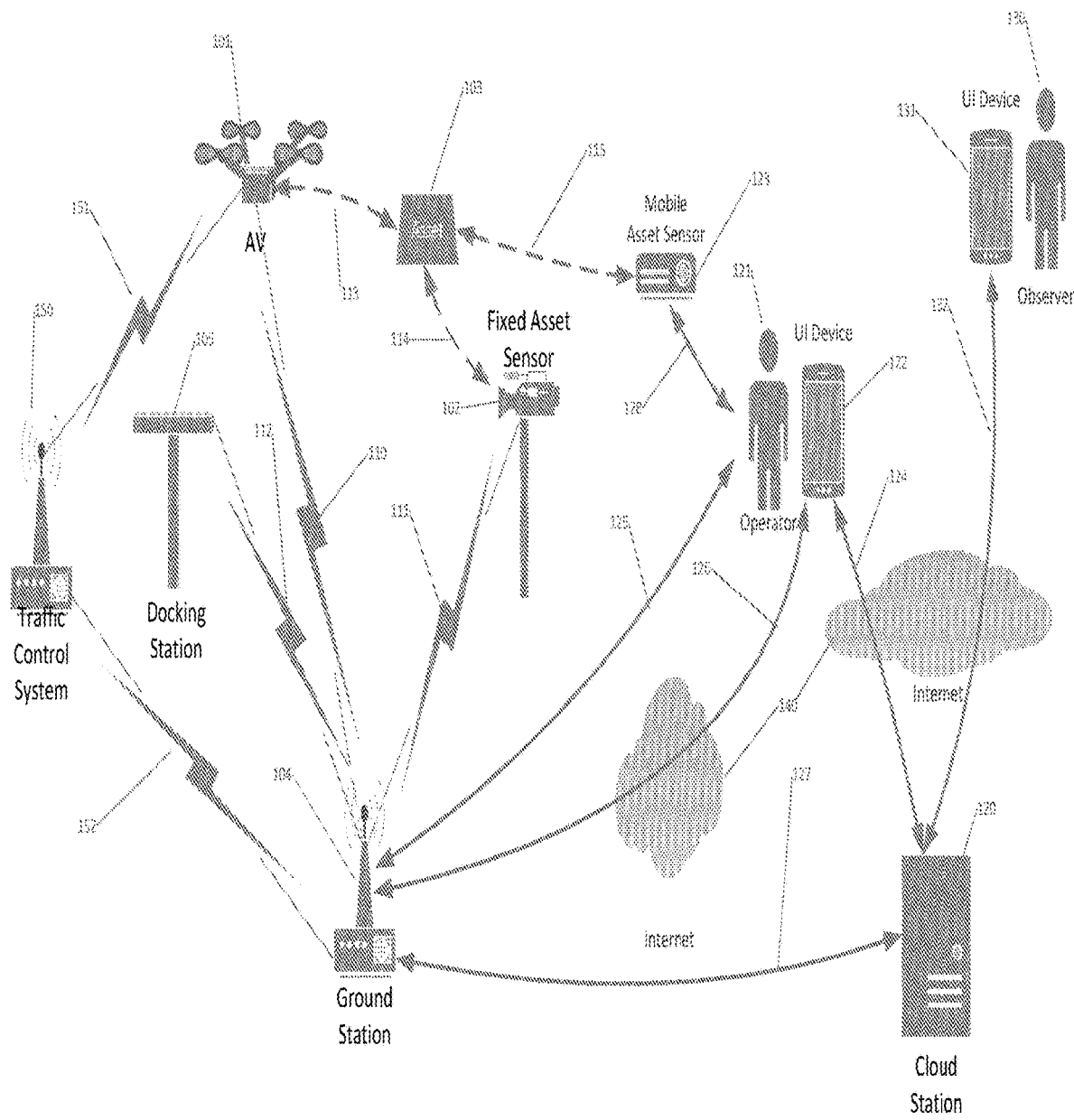
Figure 1. Main Architecture Components

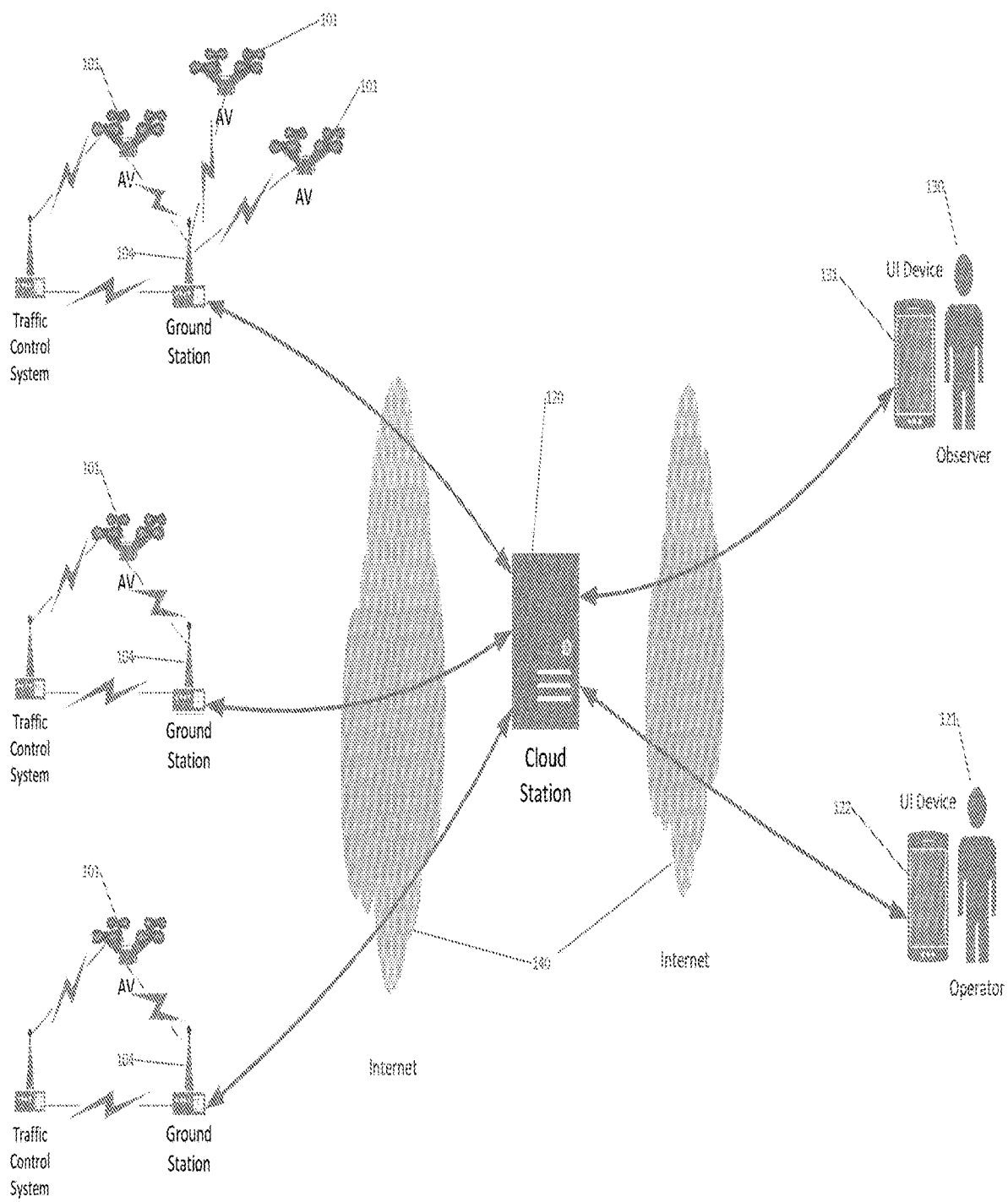
Figure 2. Expanded Architecture Components

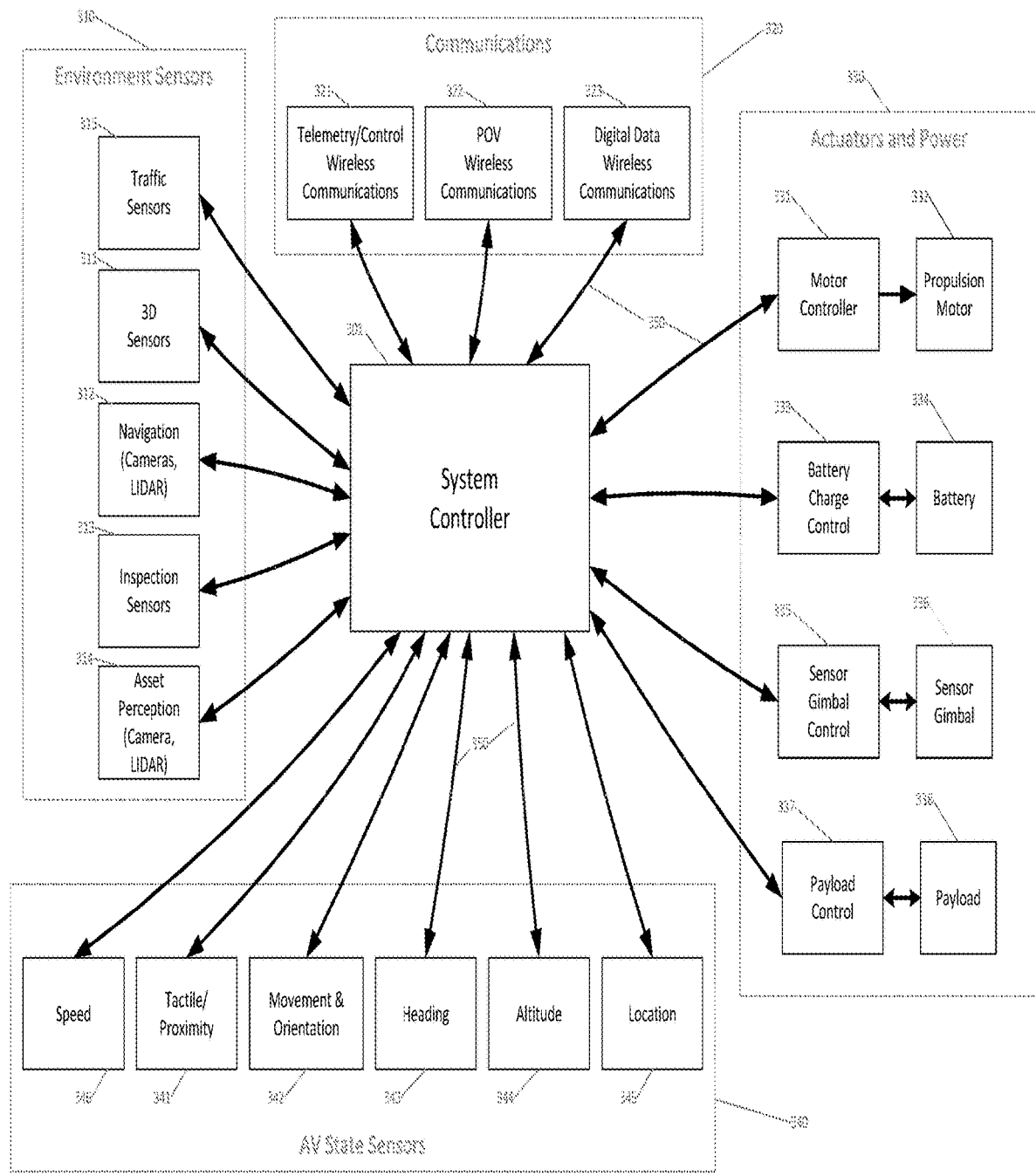
Figure 3. Automated Vehicle Subsystems

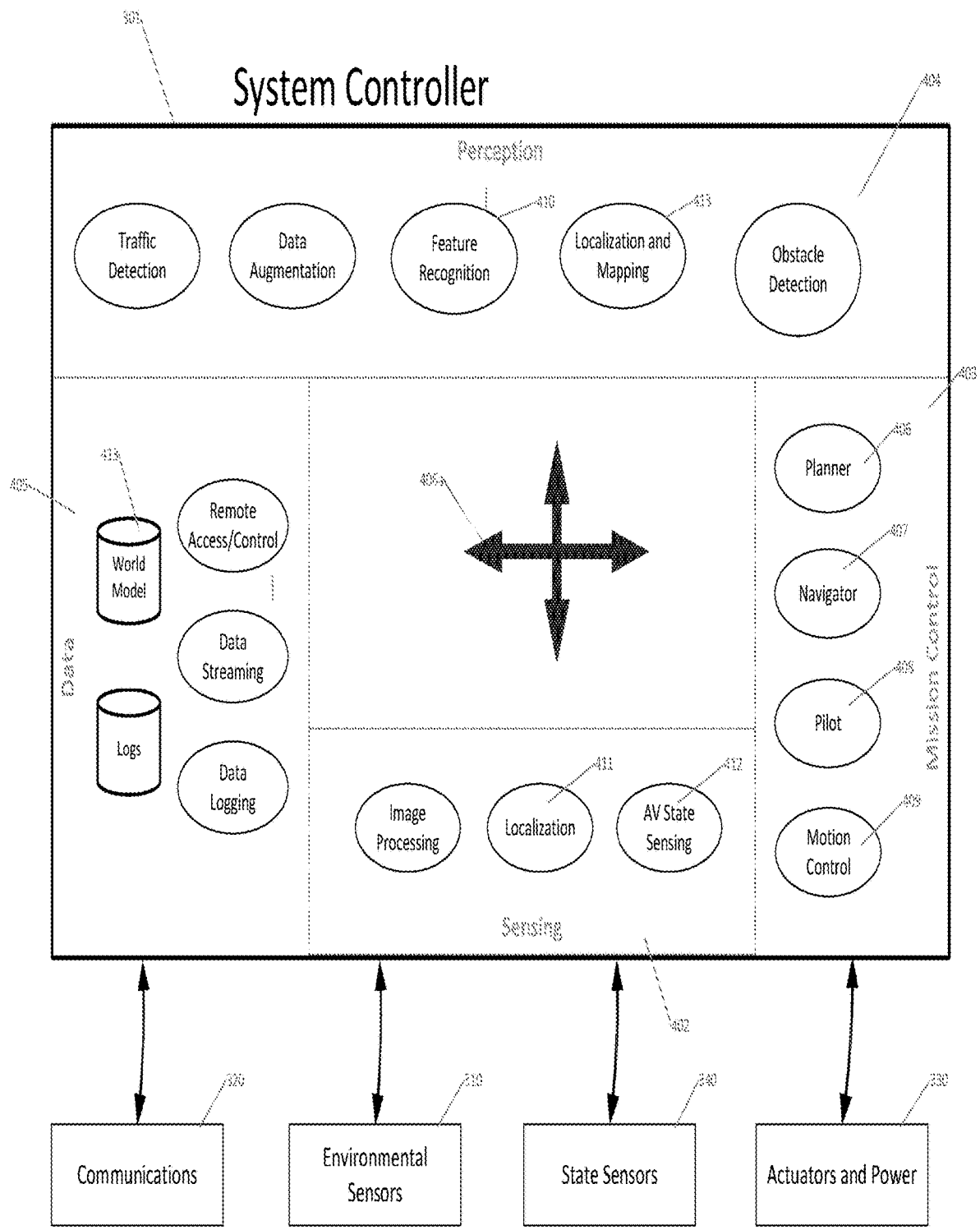
Figure 4. Autonomous Vehicle System Controller Functions

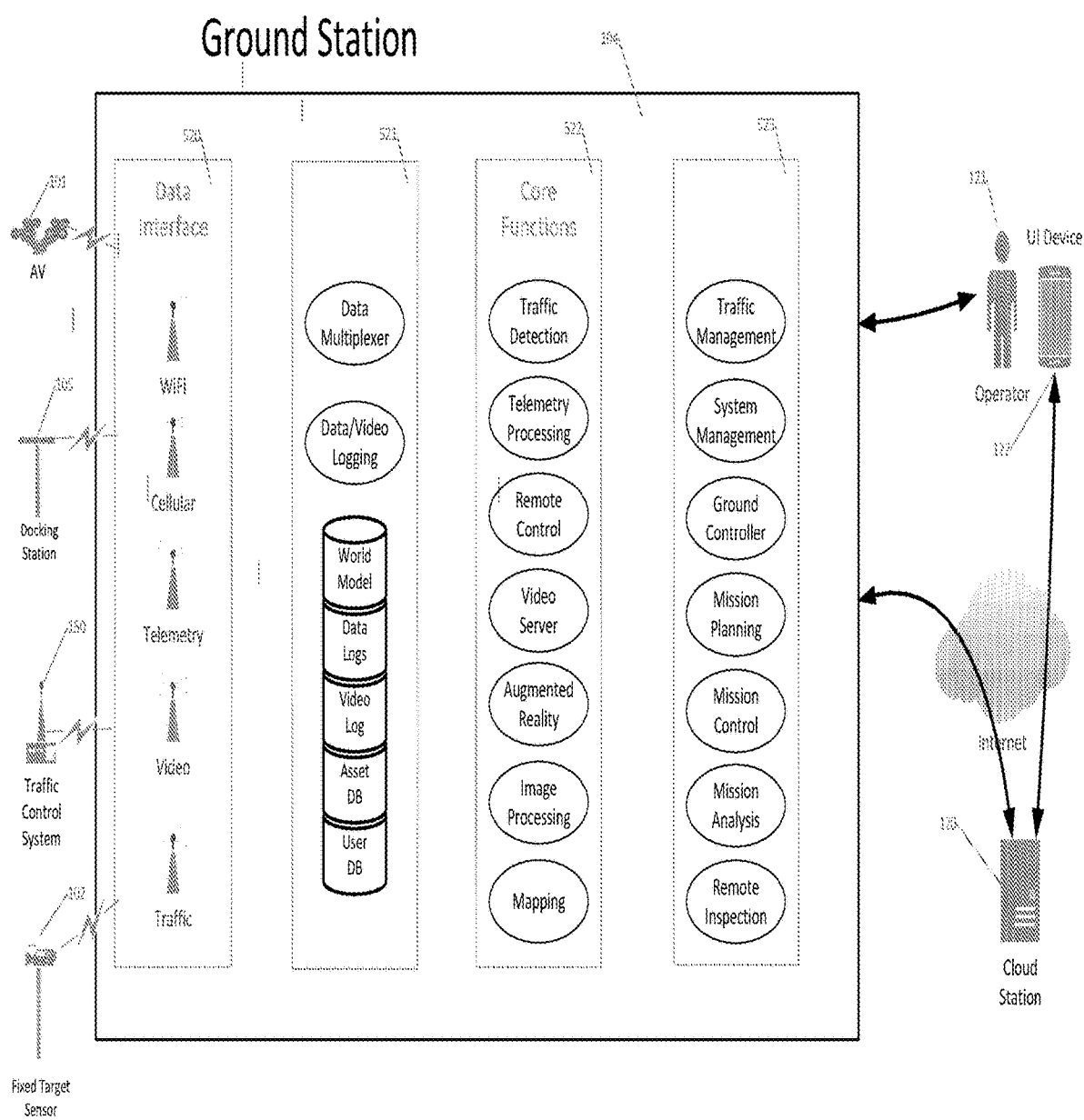
Figure 5. Ground Station Functions

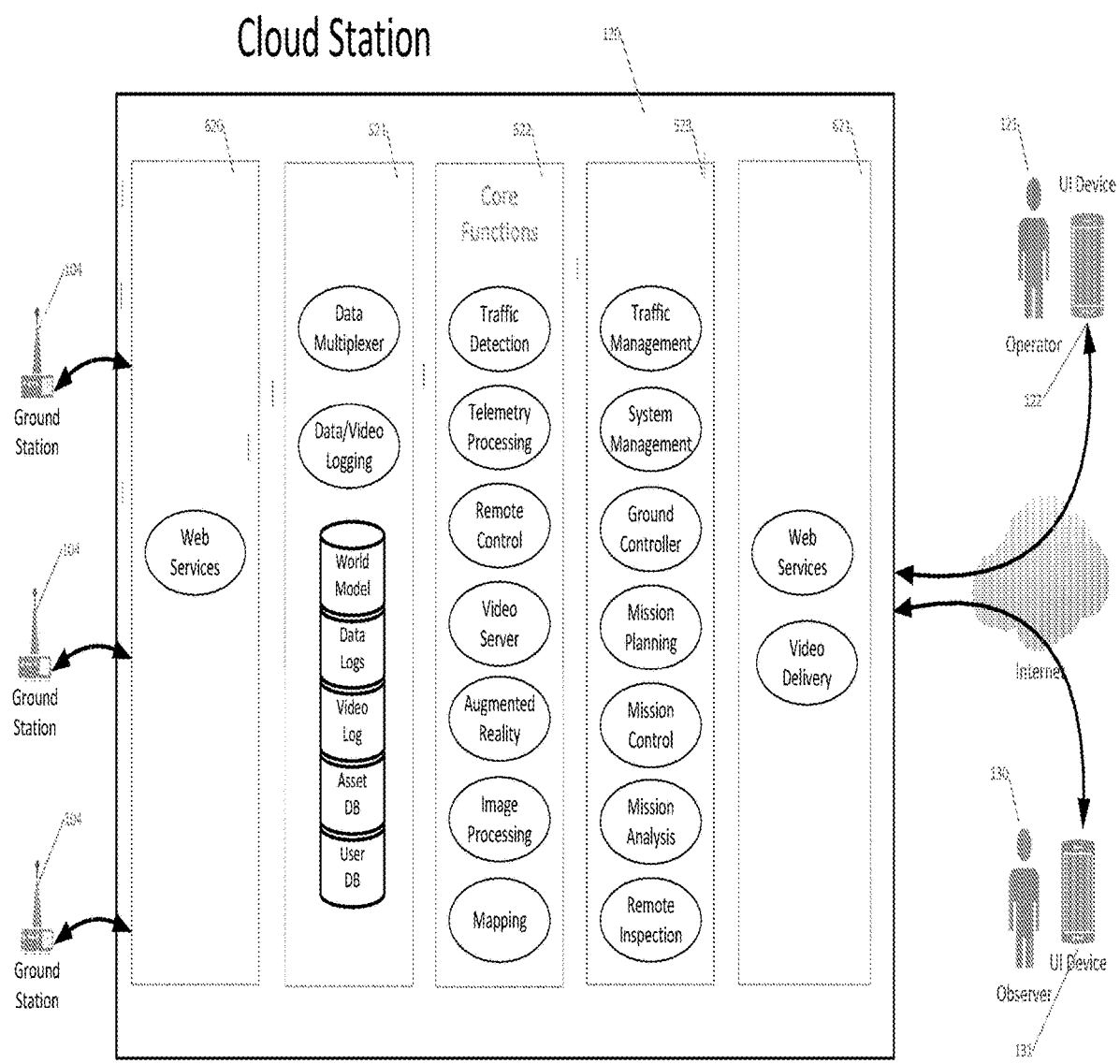
Figure 6. Cloud Station Functions

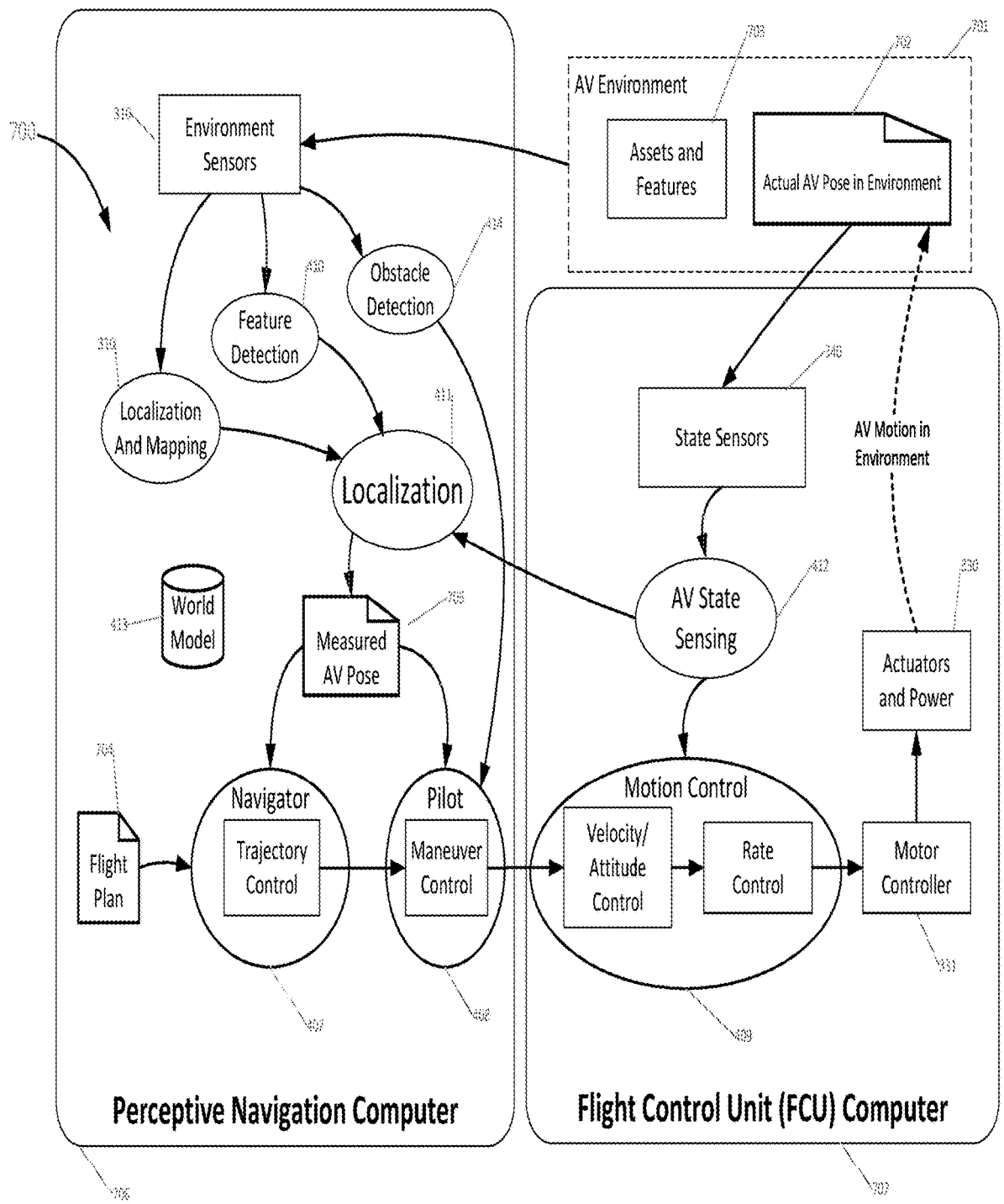
Figure 7. AV Navigation and Motion Control

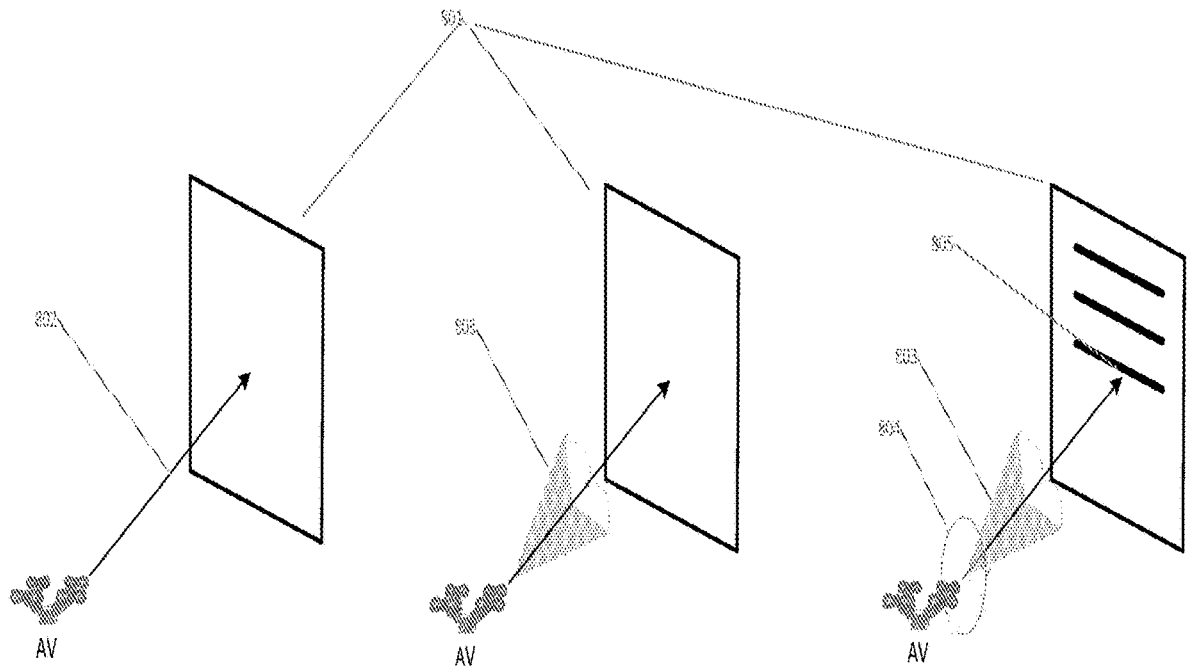
Figure 8. Vector to Planar Feature Frames of Reference

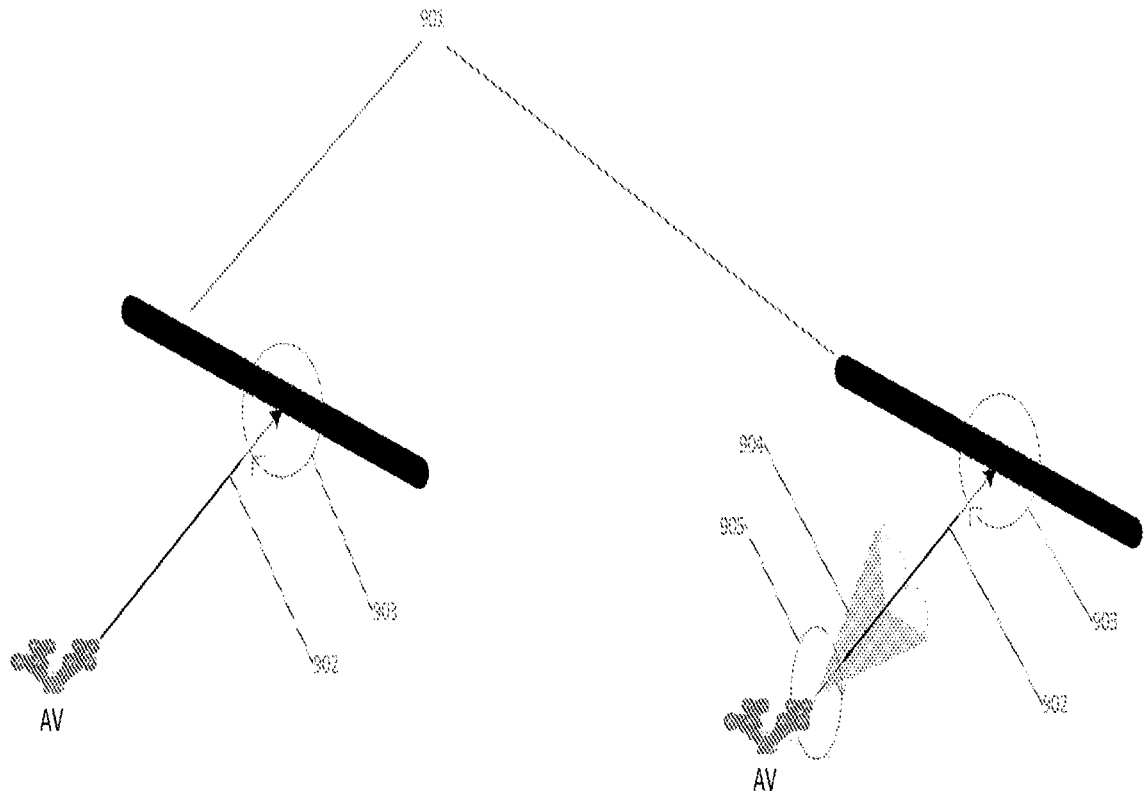
(a) 2 DOF position,
0 DOF orientation
(b) 2 DOF position,
3 DOF orientation
Figure 9. Vector to Linear Feature Frames of Reference

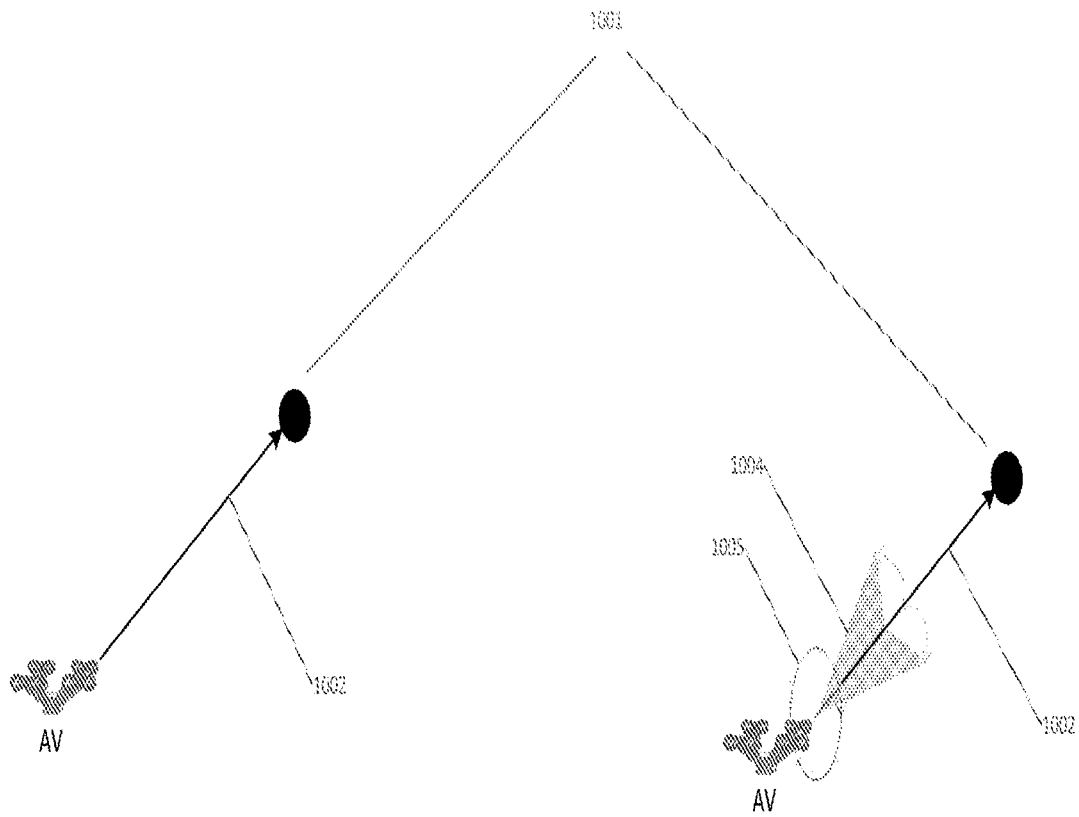
(a) 3 DOF position, 0 DOF orientation
(b) 3 DOF position, 3 DOF orientation
Figure 10. Vector to Point Feature Frames of Reference

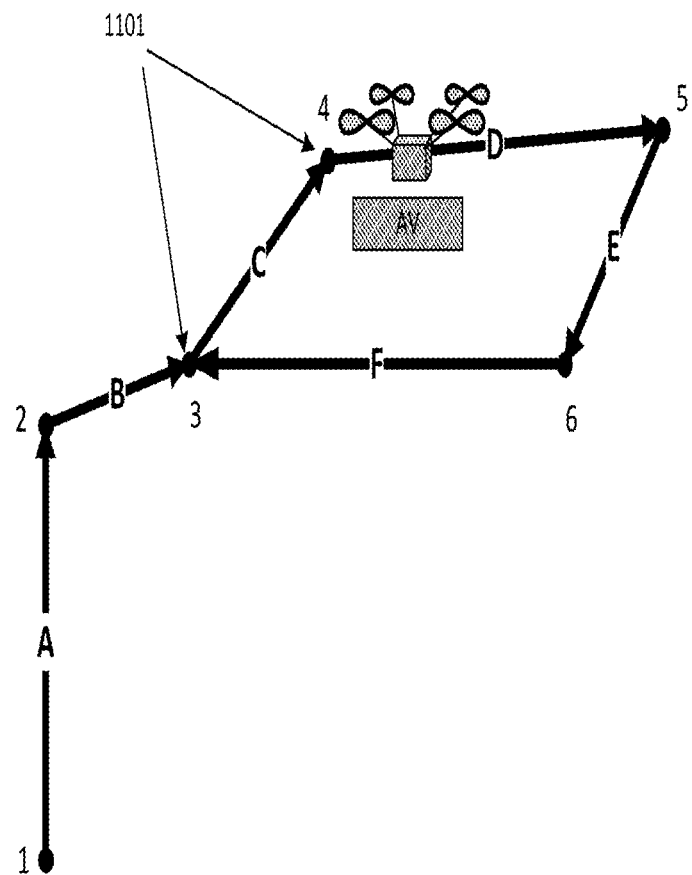
Figure 11. Typical Trajectory Based on GPS Coordinates

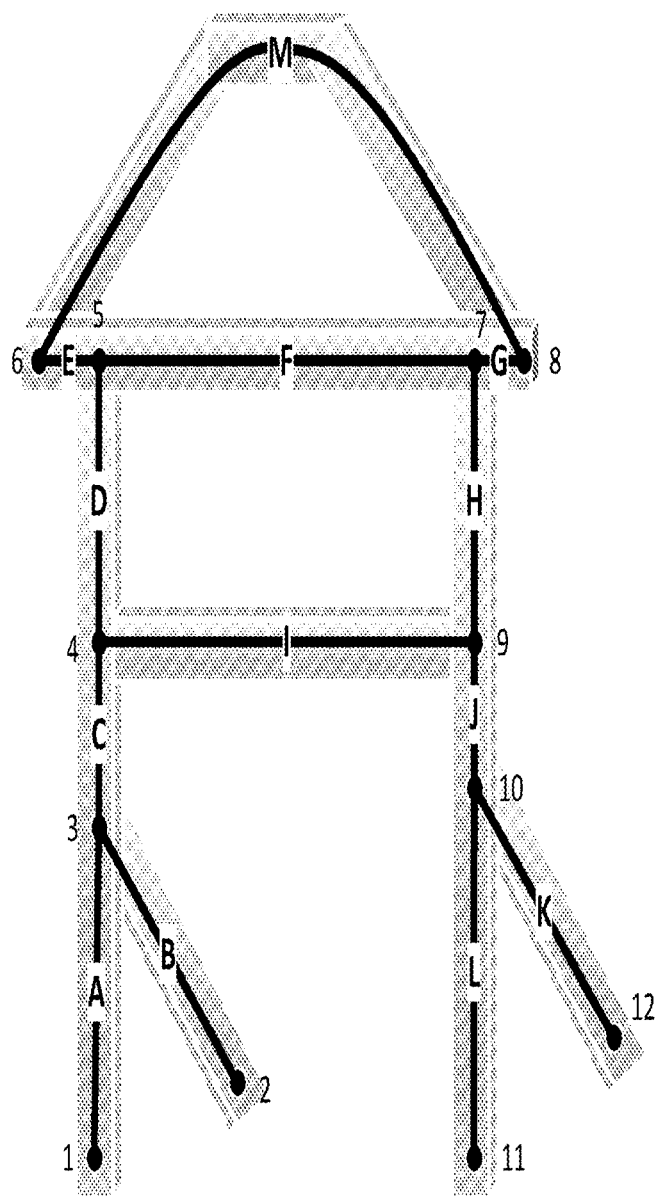
Figure 12. Asset Model Segmented into Features A - M

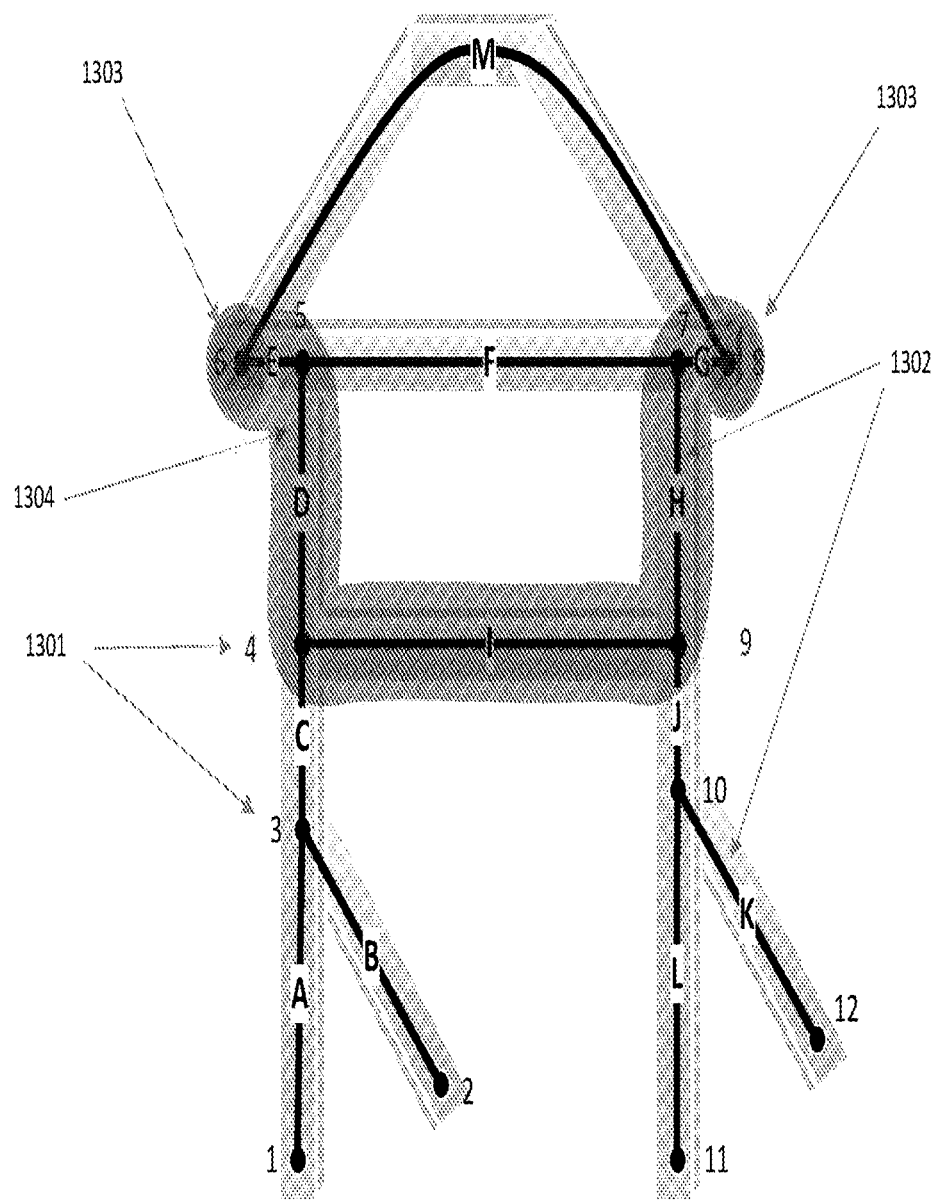
Figure 13. Feature Based Traversability Graph

SYSTEM AND METHOD FOR PERCEPTIVE NAVIGATION OF AUTOMATED VEHICLES

CROSS REFERENCE

This patent application is a continuation of non-provisional patent application Ser. No. 16/174,278, entitled SYSTEM AND METHOD FOR PERCEPTIVE NAVIGATION OF AUTOMATED VEHICLES filed on Oct. 29, 2018, which claims the benefit of provisional patent application 62/581,687 entitled SYSTEM AND METHOD FOR PERCEPTIVE NAVIGATION OF AUTOMATED VEHICLES having a filing date of Nov. 4, 2017; all of which patent applications are incorporated by reference in this patent application filing.

FIELD

The present disclosure relates to a system and method utilizing machine perception to facilitate navigation of Autonomous Vehicles (AV). More particularly, the present disclosure relates to utilizing machine perception to navigate an AV with respect to a specific Asset.

BACKGROUND

Autonomous vehicles (AVs) include unmanned air vehicles, unmanned ground vehicles, unmanned aquatic vehicles and other such unmanned vehicles. AVs are used in military applications for reconnaissance or search and rescue operations. Additionally, AVs are used in civil applications that include security work performed by police forces. Furthermore, AVs are used for the surveillance of buildings, pipelines, remote structures or other sites that require surveillance. Further still, AVs are used for traffic control, search and rescue missions, facility inspection, and warehouse auditing.

AVs are reusable unmanned vehicles capable of controlled, sustained and level movement or flight. AVs can be powered by a jet, a reciprocating engine, or be entirely electric with an onboard battery. The largest use of AVs is in military applications such as reconnaissance, i.e. preliminary or exploratory military surveying operations. AVs may also be used for attack missions.

AVs also fulfill civilian functions, such as civilian inspection, through their remote sensing capabilities. Civilian inspection requires high resolution images that are only practically retrievable from small distances, which requires AVs to be proximate to points-of-interest or targets. The high-resolution images can also ensure the quality and repeatability of the data collected by the AVs.

In a reconnaissance mission, an AV may capture images or video using a camera. Each of the images may be accompanied by specific data relating to the current position and attitude of the vehicle (i.e. pitch, roll and heading angles of the vehicle), the position and attitude of the camera relative to the vehicle, as well as predetermined installation angles of the camera (i.e. pitch, roll and heading of the camera relative to the vehicle) and the properties of the camera and the lens. The information collected from the reconnaissance mission can be stored on board the AV. Once the AV has landed, the information can be retrieved from the AV. However, if an operator desires to modify a mission plan based on information captured during the mission, this data must be streamed wirelessly to an operator or observer during the mission.

Typically military applications support GPS-enabled position determination to approximately 2 meters. However, many civilian applications involve features of interest underground, indoors, under a bridge, or otherwise in a GPS-denied environment. Further still, many civilian inspection applications require location accuracy to within 2 meters, making GPS based-location insufficient.

Accordingly, it would be desirable to eliminate one or more of the above problems by providing wirelessly enabled AVs capable of autonomous navigation based wholly upon onboard generated information, such as image data, and not GPS determined location. Additionally, it would be desirable to provide an accuracy equivalent to that of a human inspector, i.e. within 2 meters accuracy.

SUMMARY

A system and method for perceptively navigating an autonomous vehicle (AV) in an AV environment is described.

The method uses a perceptive navigation subsystem of an AV to determine a fixed local frame (LCF) having a coordinate system originating at a fixed location in three-dimensional space. The perceptive navigation subsystem then determines an AV positional pose that identifies the AV position in three-dimensional space and the AV orientation in three-dimensional space. The perceptive navigation subsystem then determines the AV positional pose within the LCF coordinate system. When the perceptive navigation subsystem detects an asset having an asset feature moving within three-dimensional space, the perceptive navigation subsystem generates an asset feature frame (AFF) having a coordinate system originating at the asset feature and determines the AV positional pose in the AFF coordinate system. The perceptive navigation subsystem then generates a motion control command based on the AV positional pose in the AFF coordinate system.

In one illustrative embodiment, the perceptive navigation subsystem receives a trajectory in a flight plan. The trajectory can be expressed in the coordinate system of the LCF or the AFF.

By way of example and not of limitation, the environmental sensor includes a camera. Additionally, the perceptive navigation system and method includes at least one of a planar feature, a linear feature, a point feature and any combination thereof.

FIGURES

The present invention will be more fully understood by reference to the following drawings which are presented for illustrative, not limiting, purposes.

FIG. 1 shows the overall architecture of the Autonomous Vehicle (AV) and support components.

FIG. 2 shows the overall architecture that supports multiple AVs.

FIG. 3 shows the subsystems of the AV platform.

FIG. 4 shows the functional components of the system controller of the AV platform.

FIG. 5 shows the functional components of the Ground Station.

FIG. 6 shows the functional components of the Cloud Station.

FIG. 7 shows the subsystems involved in the AV navigation and motion control.

FIG. 8 shows vector to planar feature frames of reference.

FIG. 9 shows vector to line feature frames of reference.

FIG. 10 shows vector to point feature frames of reference.

FIG. 11 shows typical trajectory based on Global Positioning System (GPS) coordinates.

FIG. 12 shows an Asset model segmented into features.

FIG. 13 shows a feature based traversability graph.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

An apparatus, system, and method for perceptive navigation of an autonomous vehicle (AV) is described. The AV includes a sensor and a feature detection module. The sensor is configured to identify an object. The object includes an asset, a perceived asset feature or a combination thereof.

An asset is a physical entity that has features identifiable by an AV. The asset can be man-made, i.e. a bridge or building. The asset can also be natural, i.e. a forest or crop. The position of an asset may be referenced by its distance from a fixed point of reference.

An asset feature may include a unique identifier, size, dimensions, center point, color and texture characteristics, topological data, and other such properties. For example, an edge profile for each asset may be identified from the captured images. The profile may be compared to a database of predetermined asset features to identify a match for asset classification. Proximity between assets or asset features can be used to classify the asset as being of a predetermined asset type.

The illustrative AVs described herein are configured to recognize an asset, asset feature or the combination thereof. The perceptive navigation systems and methods described herein may be used to navigate with respect to the recognized asset and/or asset feature, even in the absence of a known location for the asset and/or asset feature, GPS guidance, or other conventional navigation tools.

In operation, an AV positional pose is identified that includes an AV position in three-dimensional space and an AV orientation in three-dimensional space. A frame of reference is associated with the AV positional pose, in which the frame of reference includes a coordinate system for the AV position and the AV orientation. A localization module determines the AV positional pose with respect to the corresponding frame of reference. A feature is detected in an AV environment with an environmental sensor. An Asset Feature Frame (AFF) defines the AV positional pose with respect to the feature in the AV environment and the AV positional pose is determined by the environmental sensor.

Referring to FIG. 1, there is shown an illustrative Autonomous Vehicle (AV) system 100 that supports perceptive navigation of an AV. More generally, the apparatus, systems, and methods described herein relate to the navigation of AVs, especially as it pertains to navigating with respect to an asset feature. By way of example and not of limitation, an AV can move within its environment and perform certain tasks either with or without direct control by humans. An AV may execute an overall mission plan by using the systems, methods, and apparatuses described herein.

An AV may be a land vehicle, an air vehicle, a sea vehicle or any combination thereof. An AV may have the ability to propel itself and move within its environment. Also, the AV may have the ability to operate autonomously, i.e. in a self-governing manner. The AV may be controlled directly or indirectly by a human operator. Additionally, the AV may have the ability to determine trajectories and achieve various objectives that may be specified as part of a mission using perceptive navigation, as discussed in detail below. Furthermore, the AV may have the ability to interact with its environment, e.g. interactions with other AVs or with people. Further still, the AV may have the ability to sense its environment to determine objects within its vicinity. Further yet, the AV may have the ability to perceive, i.e. recognize specific objects within its environment.

An asset feature is anything within the vicinity of the AV that can be detected and recognized by the AV. Such objects or features can include markers or specific pieces of equipment. As further non-limiting examples, an agricultural asset feature may be crop rows, warehouse asset features may be pallet racks, beams, and columns, and bridge asset features may be beams, girders, corridors, faceplates, joints, cables, and plates. As described further below, there are various subsystems involved in perceiving these various features. The AV uses readily available sensors such as cameras, LIDAR, etc. and well-known computer vision algorithms to detect and locate the AV with respect to the asset features. Asset features are, therefore, used to perform perceptive navigation, as described further below in FIG. 7.

From a communications perspective, the AV may have the ability to communicate with human operators and observers in real time and to send various types of information to the human operators and observers. The information that is sent may include the AV state, such as a location, the AV's operational state, environmental sensor information, such as video streams, and AV data store information, such as system logs, data logs, and an AV world model. The AV may also receive information, such as AV control commands, updates to various AV operational parameters, and updates to various AV data stores, such as the AV's world model.

In the illustrative embodiment, the "state" information includes a velocity, acceleration, and the relative position of the AV 101 to nearby entities, such as the ground or objects in proximity to the AV 101.

FIG. 1 shows an illustrative AV 101 as an aerial vehicle, such as a quad copter. Within the operational vicinity of the AV 101 there is a docking station 105 where the AV may reside when it is not in operation. The docking station 105 provides shelter from the environment and provides facilities where the AV 101 may recharge. The AV 101 can depart from and return to the docking station 105 autonomously. In some embodiments, the AV 101 may operate without the use of a docking station 105 and may simply take off and return to some location on the ground or from mobile landing pad, such as a platform residing on or within a moving/movable vehicle.

In the illustrative embodiment, there is an illustrative asset 103 within the operational vicinity of the AV 101. In general, the asset 103 has two properties, an identity and a location. Thus, the AV 101 can correctly identify the asset 103 and the AV 101 can determine the location of the asset. In the illustrative embodiment, the asset 103 may be of interest to an illustrative AV operator 121.

By way of example and not of limitation, the asset 103 may be a stationary structure, a stationary natural element, a mobile man-made device, e.g. a car, a mobile natural element, e.g. a bird, or any other such stationary or mobile assets. Stationary structures may include bridges, buildings, crops, warehouses, equipment or any combination thereof. An illustrative mobile natural element may include animals, e.g. a bird, a dog, sheep, cattle, or wild animals such as deer, bison, or bears within the vicinity of the AV 101. Additionally, there may be more than one asset 103 in a location. In some instances, the AV 101 may interact with and manipulate the asset 103, which may include another AV, a person, a sign or other such asset.

In operation, the AV 101 can sense and perceive the asset 103 through one or more sensors 113. The illustrative sensor 113 may be selected from a group of sensors that include an RGB camera, a sonar sensor, a LIDAR sensor, an infrared sensor and other such sensors. In general, the sensor 113 performs two functions, namely, enabling the AV 101 to distinguish the asset 103 from the surrounding AV environment by recognizing the asset 103 and enabling the AV 101 to perceive specific features corresponding to the asset 103 by recognizing those specific features.

Additionally, the illustrative AV system 100 may include a fixed asset sensor 102 operating near the AV 101. The illustrative fixed asset sensor 102 is not mobile and provides yet another device to identify asset features and track asset features within the vicinity of the AV. The fixed asset sensor 102 can sense and perceive the asset 103 with fixed asset sensing capabilities 114.

The AV system 100 may also include a human operator 121 that can operate the AV 101. The operation of the AV 101 may include performing AV management, mission planning, mission control and/or mission analysis. AV management relates to the general maintenance and servicing of the AVs. Mission planning refers to the activities the AV is required to perform during the "mission," especially as it pertains to the collection of information associated with the asset 103. Mission planning includes the act of defining the activities corresponding to the mission. Mission control refers to the monitoring and control of the AV 101 during its mission. Mission analysis refers to the analysis of the AV mission after the AV mission has been completed. Mission analysis includes the review and analysis of any data collected by the AV 101 during the mission.

In operation, the operator 121 interacts with the AV 101 from a location that is either near the AV 101 or remote to the AV 101. The operator 121 may have access to a mobile asset sensor 123 that enables the operator to identify features on the asset 103. Like the AV 101 and the fixed asset sensor 102, the mobile asset sensor 123 includes mobile asset sensing capabilities 115 that operate with a variety of different apparatus, algorithms and systems. The mobile asset sensing capabilities 115 enable the mobile asset sensor 123 to identify the asset 103 and features corresponding to the asset 103. As described in further detail below, the identified features are associated with a particular asset, that asset's location, and an orientation with respect to that asset.

The AV system 100 also includes a ground station 104, which provides a range of functionality including communicating wirelessly with the AV 110 using illustrative communication systems or standards including, but not limited to, Wi-Fi, cellular, or other analog or digital communications technologies. The type of information communicated between the AV and ground station 104 include telemetry information from the AV 101, mission and control information to the AV 101 and application specific information such as video or images from the AV 101.

The ground station 104 may also be configured to communicate with the docking station 105 using standard wireless communication solutions such as wireless communications or wired communication systems that use Ethernet, RS485 standards, or other similar technologies. When the AV 101 is docked in the docking station 105, the information communicated between the docking station 105 and the ground station 104 includes AV telemetry information. The ground station 104 also communicates with the fixed asset sensor 102 and may receive, by way of example and not of limitation, videos or pictures captured by an illustrative camera sensor 102. By way of example and not of limitation, communications 111 between the ground station 104 and the fixed asset sensor 102 may use standard wireless communication technologies or wired communication standards such as Ethernet, RS485 standards, or other similar technologies.

In the illustrative embodiment, asset 103 information is communicated between the docking station 105 and the ground station 104. In some embodiments, the ground station 104 operates as a communications bridge between AV system 100 components. For example, there may be software applications running on the ground station 104, which may be accessed directly by the operator 121 using a communications channel 125 to communicate with the ground station 104. The operator 121 may also access data or applications on the ground station 104 using a remote communication channel 126 that is communicatively coupled to a Wide Area Network (WAN), e.g., the Internet 140, a cellular network or any combination thereof. An illustrative user interface 122 associated with a computing device may be used to remotely access the ground station 104. The computing device may include, by way of example and not of limitation, a cell phone, a tablet, a desktop computer and a laptop computer.

In another illustrative embodiment, an observer 130 may remotely access information from the AV 101 using a Wide Area Network (WAN), e.g., the Internet 132. More specifically, the observer 130 interacts with an illustrative user interface device 131, such as a smartphone or laptop running a mobile application having an associated user interface. The information accessed by the observer 130 may include AV data, e.g. camera images and videos, and application specific information associated with an asset or asset feature.

The AV system 100 may also include a cloud station 120 that is communicatively coupled to the ground station 104 with communication channel 127. The cloud station 120 includes web-based interfaces that are accessible by the operator 121, using communication channel 124, and observer 130, using communication channel 132. Cloud stations may contain many of the same applications associated with the ground station 104.

The AV system 100 may also include a traffic control system (TCS) 150 that communicates with the AV 101 and/or the ground station 104 along communication channel 152. The illustrative TCS 150 controls the traffic of other AVs (not shown) in its vicinity. By way of example and not of limitation, a TCS may include a camera system for image detection, a storage device for the detected images, an object detection algorithm. Detected images may be analyzed to determine the number of vehicles detected in all directions.

Referring to FIG. 2 there is shown an illustrative embodiment having a plurality of ground stations, in which each ground station 104 is communicatively coupled to a plurality of AVs. The cloud station 120 may be accessed by a plurality of observers 130 and a plurality of operators 121. The illustrative cloud station 120 provides a centralized integration point for information exchange with the observers 130 and operators 121. Additionally, the cloud station 120 aggregates the information from multiple AVs 101 and ground stations 104. By way of example and not of limitation, the cloud station stores images, video, location, trajectory, mission plans, AV sensor data and other such information.

Referring to FIG. 3 there are shown the various AV subsystems corresponding to the illustrative AV 101. The illustrative AV 101 includes a variety of different subsystems such as a system controller 301, a communications module 320, an environmental sensor subsystem 310, an AV state sensor subsystem 340, and actuator and power components 330. Additionally, the AV 101 includes a mechanical frame (not shown) configured to provide a suitable platform for the hardware and software comprising the various subsystems shown in FIG. 3. Furthermore, the AV 101 includes a plurality of system controller interfaces 350 for the various components of each subsystem using standard interfacing means such as various CPU busses, and serial or parallel communications devices and protocols including, but not limited to SPI, CAN, RS485, USB, I2C, Ethernet and other such communications devices and protocols.

The communications subsystem 320 manages and controls all the communications between the AV 101 and other systems or components outside, or not residing on, the AV 101. Since the AV 101 is principally in a mobile state, the communications subsystem 320 is primarily wireless and uses a variety of standard wireless technologies and protocols including, but not limited to, Wi-Fi, cellular, or other analog or digital communications suitable for the type of data being communicated. Additionally, illustrative wired communications subsystems such as Ethernet or USB may also be used when the AV 101 is docked in a docking station 105.

The communications subsystem 320 communicates telemetry and control information 321, point of view sensor information 322, and high bandwidth digital data information 323, each on respective communications channels. More specifically, the telemetry and control information 321 may include a telemetry and control information channel used to communicate telemetry and control information 321 associated with AV 101. By way of example and not of limitation, the telemetry information includes any AV state information ranging from sensor values to vehicle parameters and state. The "state" may include the inputs that are stored as variables or constants, in which the variables stored in memory can also change.

The telemetry and control information channel may also be used to send control information to the AV such as motion commands and mission plan parameters. Additionally, the telemetry and control information channel may also be used to transmit local traffic control information. In general, telemetry and control information 321 transmitted over the telemetry and control information channel includes data points or packets that are not very large, so lower bandwidth wireless communications technologies may be used for the telemetry and control information channel.

The communications subsystem 320 also communicates point of view (POV) sensor information 322 along a point of view (POV) channel. The POV sensor information 322 communicates information associated with the POV sensor, e.g., camera, sensing the environment surrounding the AV 101. The POV sensor information 322 is transmitted or communicated to the ground station 104, the cloud station 120 or any combination thereof. By way of example and not of limitation, the POV sensor information 322 includes imaging data and/or video data captured by a camera disposed on the AV 101. The camera disposed on the AV 101 provides operators 121 and observers 130 with AV generated POV sensor information 322 of a mission. Typically, the POV channel transmits analog video data. By way of example and not of limitation, the POV sensor information 322 transmitted along the POV channel includes remote surveillance video that is viewed by the operator 121 or observer 130. The communications subsystem 320 may also include digital data information 323 transmitted along a digital communications channel, which is a general communications channel that supports higher bandwidth digital data and may be used to transmit any type of information including Telemetry/Control and POV images.

The actuator and power subsystem 330 include one or more components that are used for actuating and powering the AV 101. Actuators (not shown) disposed on the AV 101 enable the AV 101 to move within and interact with the AV's environment. The actuators are powered by various subsystems of the AV 101, which include motor controllers 331, propulsion motors 332, a sensor gimbal control 335, a sensor gimbal 336, payload control 337, a payload 338, battery charge control 333, and a battery 334.

The illustrative motor controllers 331 and propulsion motors 332 enable the AV 101 to move within its environment. In the case of a rotary aircraft this might include motors that drive propellers, and in the case of a land-based vehicle this might include motors for the drive wheels and steering mechanism. The motor controller 331 receives motion and attitude commands from the system controller and translates those commands into specific motor instructions for the various motors designed to cause the AV to comply with the motion and attitude commands.

The Sensor Gimbal Control 335 and Sensor Gimbal 336 are used to control the pointing of one or more environment sensor, i.e., cameras. The sensor gimbal control 336 receives sensor attitude commands from the system controller 301 and translates those attitude commands into motor commands designed to cause the sensor gimbal to orient in a manner complying with the sensor attitude commands.

The Payload Control 337 is used to control any payload 338 the AV 101 may be carrying. Control of a payload 338 can include picking up and/or dropping payloads 338. The payload control 337 receives commands from the system controller 301 concerning payload disposition and translates those commands into the appropriate corresponding actuation of the payload control.

In some embodiments, the various systems on the AV 101 are electric and require some sort of battery 334 to provide power during remote operation. the Battery Charge Control 333 subsystem controls the charging of the battery 334 and provides information to the system controller 301 concerning the state of the battery 334.

The illustrative system controller 301 provides the main subsystem responsible for processing data and providing control functions for the AV 101. The system controller subsystem 301 is described in further detail in FIG. 4.

The AV state sensor subsystem 340 allows the AV 101 to sense its own "state." For the illustrative AV 101, the "state" of the AV 101 is expressed as a position and orientation (also termed a "positional pose") in three-dimensional (3-D) space. The "positional pose" includes the attributes: six degrees of freedom (6 DOF), three positional coordinates and three rotational coordinates (orientation) around each spatial axis. In the illustrative embodiment, the "state" of the AV can further include a velocity, acceleration, and the relative position of the AV 101 to nearby entities, such as the ground or objects in proximity to the AV 101.

The "frame of reference" is a coordinate system that provides context for the position and orientation coordinates of the positional pose. In the illustrative AV embodiment, the positional pose of the Av is an attribute of the AV and serves to specify the location of the AV (position and orientation) within a "frame of reference." The "frame of reference" is specified by a coordinate system (e.g. polar, Cartesian, etc.), units for the coordinates (e.g. meters, radians, etc.), and a system for specifying the direction of rotation around each axis (e.g. right hand rule).

In the illustrative embodiment presented herein, the AV navigation can employ one or more frames of reference, including a fixed geo-reference frame (GRF), fixed local frames (LCF), and relative body frames (RBF). The geo-reference frame (GRF) provides the location of the AV with respect to the surface of the earth, i.e. a sphere. The fixed local frames (LCF) provides a cartesian coordinate space that may be mapped to the GRF through a transform. However, in many instances a transform from an LCF to the GRF may not exist.

The relative body frame (RBF) provides a cartesian coordinate space having an axis aligned with the body of the AV. Also, the RBF may have the Cartesian coordinate space aligned with the major axis of the body of the AV. The RBF alignment depends on the symmetry and shape of the AV body. The RBF coordinate space moves with respect to the LCF and GRF as the AV moves through the LCF and GRF.

In some embodiments, there may exist multiple instances of the LCF and RBF and so there may be numerous transforms between the various LCFs and RBFs. For example, each asset of interest can have its own LCF, each AV sensor (e.g. camera) can have its own RBF with a transform between the sensor RBF and the AV's RBF. More specifically, each LCF frame of reference may be uniquely identified, e.g. LCF-1 and LCF-2.

The AV state sensor subsystem 340 includes speed sensors 346, tactile/proximity sensors 341, movement/orientation sensors 342, heading sensors 343, altitude sensors 344, and location sensors 345. The speed sensors 346 measure the speed of the AV 101 using air speed indicators or encoders on wheels. The tactile/proximity sensors 341 include by way of example but not of limitation, sonar, infrared, ranging (LIDAR) sensors, RADAR, and other light detection sensors.

The tactile/proximity sensors 341 indicate the proximity of the AV 101 to barriers, obstacles, and the ground. The movement/orientation sensors 342 determine the movement and orientation of the AV 101 through sensors including accelerometers and gyroscopes. Accelerometers and gyroscopes are generally integrated together in an Inertial Measurement Unit (IMU). The heading sensors 343 determine the heading of the AV 101 within an environment, typically the environment of the AV 101. The heading sensors 343 determine the heading of the AV 101 within an environment using electronic/digital compass technology. The altitude sensors 344 include barometers, ranging technology (i.e., ultrasonic and laser range finders), and stereo cameras. The altitude sensors 344 employ barometers to determine a mean sea level (MSL), and stereo cameras to determine an above ground level (AGL). The location sensors 345 determine the location of the AV 101 within its environment, and a Global Positioning System (GPS) or other system based upon beacons placed within the environment.

The environmental sensor subsystem 310 allows the AV 101 to sense its environment. The various functions of the environment sensor subsystem 310 disclosed herein may be implemented using any one of the sensors disclosed or any combination thereof. For example, the environmental sensor may be a single camera that may be used to implement more than one of the functions described herein. The environment sensor subsystem 310 can include 3-D sensors 311, navigation sensors 312, inspection sensors 313, asset perception sensors 314, and traffic sensors 315.

The 3-D sensors 311 sense and create 3-D profiles of the objects around the AV 101. In some embodiments, the 3-D sensors create depth maps and "point clouds" within the field of view of the sensors. A "point cloud" is a set of points in 3-D space with respect to the AV's location and corresponds to the known location of an object. The 3-D sensor can be Light Detecting and Ranging (LIDAR), sonar, stereo cameras, range sensors (e.g. infrared, ultrasonic, laser), RADAR, or any combination thereof. The 3-D sensors can perform a variety of functions including asset perception, obstacle avoidance, navigation, location, and mapping.

The navigation sensors 312 ensure that the AV 101 is accurately and safely following the trajectory that the AV 101 is attempting to navigate by localizing the AV 101 within a frame of reference. As stated above, the navigation sensors can include any one or combination of the 3-D sensors 311, and can also include other sensors that detect and recognize certain landmarks within the AV environment. For illustrative purposes, landmarks may include visible fiduciary markers, such as April tags that may be placed at specific locations within the environment.

The inspection sensors 313 capture relevant information pertaining to an asset 103 that is under inspection by the AV 101. The inspection sensors 313 can be autonomous or manually operated by an operator 121. The inspection sensors 313 can include cameras operating in the visible spectrum, infrared, ultraviolet, multi-spectral, and any combination thereof. As stated above, the inspection camera can be the same camera used for navigation. The inspection sensors 313 can include cameras that capture images, which are used remotely by the operator 121 and observer 130 as part of a mission.

The asset perception sensors 314 identify specific features of an asset 103 in the AV environment. By way of example but not of limitation, the asset perception sensors 314 may employ machine vision. In some embodiments, the asset perception sensor 314 is identical to the sensor used to collect 3-D information or navigation data.

The traffic sensors 315 sense vehicle traffic near the AV 101. In some embodiments, the traffic sensor 315 is embodied as a transponder that facilitates communications with a local traffic system 150 as shown in FIG. 1.

Referring now to FIG. 4, there is shown a detailed block diagram of the system controller 301. As discussed above, the system controller 301 interfaces with several subsystems of the AV 101 including the communications subsystem 320, the environmental subsystem 310, the AV state sensor subsystem 340, and the actuator and power subsystem 330. The system controller 301 can be implemented using standard processors and off-the-shelf electronics. The system controller 301 can utilize a readily available operating system 406, such as Ubuntu or the Robot Operating System (ROS), to manage the various tasks and software running on the system controller 301. The software functionality of the system controller can be partitioned into the following groups: sensing 402, perception 404, mission control 403, and system data management 405.

The sensing functionality 402 of the system controller 301 is responsible for the system controller's 301 capability to sense various elements, both the system controller's own state and the state of the environment. The sensing functions performed can include localization 411, image processing, and AV state sensing 412.

Localization 411 is the act of locating the AV 101 within a frame of reference outside the AV 101. The system controller 301 receives inputs from one or more sources including an AV state sensing module, a feature recognition module 410, and a localization and mapping module 413. In one embodiment, the system controller 301 receives input from a GPS, and calculates the AV location in an Earth frame of reference. In another embodiment, the system controller 301 receives input from multiple sensors, such as an IMU and visual odometer, and fuses the various measurements. In still another embodiment, the system controller 301 performs a simultaneous localization and mapping (SLAM) process, in which the AV 101 is localized with respect to objects within its environment from data received from environmental sensors. In an exemplary embodiment, a landing pad is the asset feature identified, and the AV 101 is localized with respect to the landing pad. In another exemplary embodiment, beacons can be installed in the AV environment to enable performance of triangulation or trilateration to localize the AV 101 with respect to the beacons.

Image processing includes the process of taking images from one or more environment sensors, e.g., cameras, and processing the images to extract useful information. The extraction function generally includes various low level filters, transforms, and feature extractions performed on the images. Extraction can be performed using readily available software, such as OpenCV or OpenVX.

An AV state sensing 412 is performed by one or more of a variety of sensors that measure the state of the AV 101, as described above. In one embodiment, AV state sensing is performed with input received from a GPS, in this embodiment little additional processing is required to use the GPS data input.

In other embodiments, AV state sensing 412 is performed with input received from sensors that require additional processing of the sensor data for the AV state information to be readily usable by the other subsystems; this additional processing can include filtering and sensor fusion between multiple sensors. Sensor fusion aids in the reduction of error characteristics. Different sensors used for localization have different error characteristics that are minimized by the localization module through sensor fusion using techniques such as Extended Kalman Filters (EKF) to fuse the locations generated by different sensors. Sensor fusion increase the accuracy of the location in a particular frame of reference. A well-known example is the fusing of measurements from an IMU with GPS readings using an EKF.

The perception functionality 404 of the system controller 301 is responsible for the system controller's 301 ability to recognize and categorize the various elements and states sensed by the AV sensors. The perception functions performed can include data augmentation, feature recognition 410, localization and mapping 413, obstacle detection/recognition and tracking, and traffic detection. Data augmentation is the act of generating and adding additional visual information to images and video that can be streamed to the operator 121 or observer 130. In some embodiments, data augmentation can include the addition of labels or other data superimposed on images or video.

Feature recognition 410 employs machine perception to identify and track known features of assets 103 and the environment around the AV 101 from processed images. Generally, feature recognition 410 provides input to the process of localization 411.

The localization and mapping functions 413 include localizing the AV 101 in the world and can also include updating a world model of the AV 101. The world model of the AV 101 is updated from data received by the environment sensors. In some embodiments, readily available SLAM and visual odometry techniques are employed to update the world model. The localization and mapping functions 413 provide input to the process of localization 411 and play a role in perceptive navigation, which is described later.

Obstacle detection/recognition and tracking relates to detecting obstacles within the field of view of the AV 101. The obstacle detection/recognition and tracking process identifies physical objects that may impact the performance of the AV 101 during a mission. However, the obstacle detection/recognition and tracking process need not identify what the obstacles are, and therefore can use simpler sensors and techniques than those employed for perceptive navigation. Traffic detection relates to the function of detecting other vehicle traffic in the vicinity of the AV 101.

The mission control functionality 403 of the system controller 301 relates to the execution of a mission plan and the management of various AV activities during the mission that are collectively termed mission objectives. A mission plan includes a set of tasks, such as, route planning, navigation, en route actions, payload management, and en route data acquisition. Data acquisition can be logged and/or streamed to the ground station 104 in real time. The mission control functionality 403 operates hierarchically through a planner 406, a navigator 407, a pilot 408, and a motion controller 409.

The planner 406 generates instructions aimed toward the achievement of mission plan objectives. Mission objectives to be achieved by the AV 101 include dates/times for achieving those mission objectives. In one embodiment, the AV 101 is an aerial AV and the associated mission objectives include one or more flight plans and actions to be taken by the aerial AV along a flight path described by the one or more flight plans. Thus, the flight plans are instructions that control the motion of the aerial AV and the actions correspond to instructions for non-motion related activities, such as "take pictures" during the one or more flight plans or along the flight path. The motion related instructions can include a trajectory. A trajectory is defined as a flight path constructed from a sequence of maneuvers within a frame of reference. Traditionally a flight path was defined as a sequence of poses or waypoints in either a fixed geo-reference frame (GRF) or a fixed local frame (LCF). However, perceptive navigation allows trajectories to be defined using coordinates in Asset Feature Frames as well.

The navigator 407 performs the motion related instructions specified by the planner 406. The navigator 407 receives the mission objectives from the planner 406 and generates a set of instructions that achieve those mission objectives. The navigator 407 then tracks the AV's 101 progress with regard to the mission objectives. In one embodiment, the mission objectives include a trajectory for the AV 101 to follow. In this embodiment, the navigator 407 translates the trajectory into a sequence of maneuvers to be performed by the AV 101. The navigator 407 generates maneuver instructions for the pilot 408. Maneuvers can be predefined actions that the AV can execute, including launch, land, orbit a point, follow a feature, and follow a trajectory.

The pilot 408 performs and is responsible for position control of the AV 101 through the generation of motion commands. Additionally, the pilot 408 is responsible for collision avoidance. The pilot 408 receives maneuver instructions from the navigator 407, executes an action corresponding to a maneuver instruction, and attempts to achieve the maneuver instruction. In some embodiments, motion commands generated by the pilot 408 are within a frame of reference. In other embodiments, maneuver instructions require a detailed model of the AV 101 for proper execution by the pilot 408.

The motion controller 409 performs low level closed loop control in order to execute commands received from the pilot 408. The motion controller 409 receives commands from the pilot 408 and performs actuation of the AV 101. In some embodiments, the motion commands received from the pilot 408 include velocity or attitude commands.

In addition to information flowing from the planner 406b to the navigator 407 to the pilot 408 as discussed generally above, information can also flow from the pilot 408 to the navigator 407 to the planner 406. In an exemplary embodiment, this flow of information represents feedback, such as whether tasks or mission objectives have been achieved. If mission objectives are not achieved, the planner 406, the navigator 407, and the pilot 408 can take appropriate responsive actions to alter or change the mission, the flight plan, or one or more objectives. Exemplary scenarios that can cause the planner 406, the navigator 407, or the pilot 408 to alter or change one or more mission objectives include: unforeseen obstacles, vehicle traffic near the AV 101, any inability to perform one or more objectives or tasks, or a malfunction related to one or more systems or subsystems of the AV 101. Note, traffic control may require an AV's mission control subsystem 403 to coordinate actions with a third-party traffic control system.

The system data management functionality 405 of the system controller 301 includes storing a variety of information onboard the AV 101 and various data management tasks. Data stores on the AV 101 can be implemented in a variety of standard manners and forms including databases and file systems.

The data stores on the AV 101 include a world model 413. The world model 413 is a representation of the environment that the AV 101 operates within. The world model 413 can include a two-dimensional (2-D) map database of the AV's environment and/or a 3-D map database of the AV's environment. The world model 413 can also include a model of the AV itself, including the AV's operational capabilities and constraints or limitations.

Additionally, the data stores of the AV 101 include data logs. The "logs act" as the receptors of data that the AV generates or collects. The logs can include AV state information, system operation logs, and sensor data, such as images and video.

The data management tasks include remote access/control, data streaming, and data logging. Remote access and remote control tasks include the management of data originating from the AV, which include remote control commands or data, and parameters that are sent to the AV. Data streaming tasks include the streaming of data to the ground station 104. Streamed data can include telemetry data, images, and video. Data logging tasks include logging data to the AV data stores.

Referring now to FIG. 5, there is shown an illustrative ground station 104. The ground station 104 communicatively coupled with the AV 101, the docking station 105, and the fixed target sensor 102. Additionally, the ground station 104 is communicatively coupled with the operator 121 and the cloud station 120.

The illustrative ground station 104 operates using a central processing unit (CPU), memory and various communications technologies. By way of example and not of limitation, the ground station 104 may include a data interface 520, ground station data management module 521, a core functions component 522, and applications module 523. However, in some embodiments the ground station 104 may perform more limited functions and include a communications hub for communicating with an AV 101. In addition to storing data, the ground station 104 routes data between the various components such as the fixed sensor 102, the AV 101, the observer 130, the operator 121, and the cloud station 120, the UI device 122, and the mobile asset sensor 123. In some illustrative embodiments, data routing may be a dedicated function performed by the ground station 104.

The data interface 520 provides communication services to the AV 101, the docking station 105, and the fixed asset sensor 102. The communications services may include wireless communications utilizing wireless technology, such as Wi-Fi, cellular, low bandwidth telemetry, analog video communications and other such communication services. In some illustrative embodiments, the data interface may provide a wired connection to the ground station 104 that utilizes Ethernet, USB, or other similar technologies.

The ground station data management module 521 manages a wide range of data. In the illustrative embodiment, the data stored in the ground station 104 includes a database and a file system. For example, the data stored in the ground station may include data for a world model, a data log, a video log, an asset database, a user database and other such systems, components and modules configured to store and/or process data. In addition to the storing of the data described herein, the ground station 104 handles routing data between varieties of components and in certain circumstances the ground station 104 only performs the routing of data.

As described above, the world model associated with the ground station 104 provides a representation of the environment that the AV 101 operates within. The world model can include a two-dimensional (2-D) map database of the AV's environment and/or a 3-D map database of the AV's environment. The world model can also include a model of the AV itself, including the AV's operational capabilities and constraints or limitations.

Data logs associated with the ground station 104 store telemetry from the AV and system operation logs. Video logs include image data, video data or the combination thereof that are streamed from the AV and stored by the ground station 104. The illustrative asset database stores attribute information of various assets that interface with the ground station 104, including the AV 101, the docking station 105 and other such devices. The user database stores operator information.

The core functions 522 performed by the ground station 104 can include traffic detection, telemetry processing, remote control, video server management, reality augmentation, image processing, and mapping. Traffic detection relates to the function of detecting other vehicle traffic near the AV 101. Another illustrative core function 522 of the ground station 104 includes processing all telemetry information received from the AVs in preparation for either logging the data or providing the data to the operator 121 or observer 130 as part of a mission plan.

The other core functions 552 performed by the ground station 104 include remote control core function which allow an operator 121 to remotely control the AV 101. The ground station 104 may also perform a video server core function, in which servers are used to stream images and video received from the AV 101 to operators 121 and observers 130. Another core function performed by the ground station 104 includes augmented reality, which relates to the process of superimposing additional information on images and video received from an AV 101 to aid operators and observers with viewing and reviewing the images and video.

Yet another core function performed by the ground station 104 includes image processing, in which the process of taking images from one or more environment sensors, e.g. cameras, and processing the images to extract useful information. The extraction process generally includes various low-level filters, transforms, and feature extractions performed on the images. More specifically, the extraction process may be performed using readily available software, such as OpenCV or OpenVX.

Still another core function performed by the ground station 104 includes the mapping core function, which includes updating the world model based on data received from the AVs. In some embodiments, the mapping core function includes compiling the output of the AV's localization and mapping process into a centralized world model for all AVs.

Various of the core functions 522 of the ground station 104 support applications 523 that can be used by the operator 121 or the observer 130. These applications 523 can include, but are not limited to, traffic management, system management, ground controller, mission planning, mission control, mission analysis, and remote inspection. The traffic management application includes the process of coordinating the movements of AVs near the ground station 104 to ensure safe operation of all vehicles near the ground station 104; safe operation includes collision avoidance and vehicle movement optimization through coordinating the movements of AVs. The system management application manages various physical components including AVs, ground stations, docking stations, etc. The system management application further manages the configuration of these various physical components. The ground controller application can be used by an operator 121 to control and monitor one or more AVs. The mission planning application can be used by an operator 121 in preparation for an AV mission to plan activities, tasks, objectives, or actions to be performed by an AV during the mission. These activities, tasks, objectives, or actions can include inputting waypoints, inputting areas, locations, assets, or asset features for inspection, capture image, take video, and other such activities. The mission control application executes and monitors a mission being performed by an AV 101. Mission monitoring includes monitoring various AV state information, and allowing operators 121 or observers 130 to view streams of images and/or video from the AV 101; and the mission control application can include some remote control of the AV and input from an operator. The mission analysis application analyzes a mission after completion of the mission; and the mission analysis application can further replay various telemetry data streams collected during the mission. The remote inspection application allows for the viewing of streams of images and/or video from the AV by an operator 121 or observer 130; and this viewing can be provided in real time or replayed after a mission is completed.

Referring now to FIG. 6, there is shown the various functions of the cloud station 120. The cloud station 120 is designed to interface with one or more ground stations 104, one or more operators 121, and one or more observers 130. As with the ground station 104, the cloud station 120 can include data management 521, core functions 522, and applications 503. Thus, these functions can exist in the ground station 104, the cloud station 120, or both.

The cloud station 120 interfaces with one or more ground stations 104 through a web services interface 620. The web services can be implemented using standard methodologies, such as SOAP, REST, JSON, and other such web services. The web services 620 implement standard web-based security mechanisms. The cloud station 620 can provide the same functions as the ground station 104. In certain embodiments the cloud station 120 interfaces with multiple ground stations 104, and thus aggregates information from the multiple ground stations 104. The cloud station 120 may be configured to provide a web-based interface to operators 121 and observers 130, so that operators 121 and observers 130 can utilize web-based UI devices 122 and 131, respectively. The web-based interfaces utilize standard methodologies and web-based user applications. The cloud station 120 is configured to be implemented through computer servers having a processor and memory, including virtual servers available from various service providers.

Referring now to FIG. 7, there is shown a flow chart depicting a perceptive navigation control loop. In the illustrative embodiment, the perceptive navigation control loop 700 is a closed loop control system that includes a desired trajectory, described by a flight plan 704 through state space, which is represented by a reference frame.

As discussed above, the AV navigation may employ one or more frames of reference including a fixed geo-reference frame (GRF), fixed local frames (LCF), and relative body frames (RBF). Perceptive navigation employs a further type of reference frame, namely, an asset feature frame (AFF). As previously stated, an asset feature frame (AFF) defines the AV positional pose with respect to the feature in the AV environment and the AV positional pose is determined by the environmental sensor.

In the illustrative embodiment, the flight path of the AV is specified in terms of known features 703 perceived 410 by the AV environmental sensors 310 as opposed to simple coordinates as is typically done when specifying a flight plan and performing navigation. The AV's current state, i.e. positional pose 702, and actual trajectory in the state space are determined from sensor measurements of asset features having known locations, GPS, or other similar technologies. In the case of asset feature measurement, the sensor measurements are processed by a localization module 411 with respect to some specific known asset feature having a location and measured orientation in the AV environment to produce a measured AV pose 705.

Therefore, perceptive navigation is differentiated from existing techniques such as SLAM, in which navigation is typically performed in a fixed coordinate frame and any features in the environment that are perceived by the AV are mapped to that coordinate frame.

In operation, the navigator 407 receives the measured AV pose 705 and compares the measured AV pose 705 to the trajectory to produce a course correction that directs the AV towards the flight plan trajectory. The pilot 408 receives the course correction and determines the requisite maneuver(s). The motion control module 409 receives the maneuvers and determines the requisite motor control instructions for the various motors and actuators of the AV. The motor controller 331 receives the motor control instructions and activates the actuators and motors 330 accordingly.

Additionally, the motion controller 409 compares the actual trajectory of the AV in the state space to the desired trajectory and adjusts the motion of the AV in order to bring the measured or perceived trajectory of the AV as close as possible to the desired trajectory and pose determined from the flight plan 704.

As described above, the AV includes environmental sensors 310, which are used to perceive objects, such as assets and asset features, within the environment. As depicted in FIG. 7, the output of the environmental sensors 310 is used for localization and mapping 310, feature detection 410, and obstacle detection 414. The localization and mapping module 310 and the feature detection module 410 provide input to the localization module 411.

Additionally, there exist state sensors 340 that can measure the state of the AV in its environment. These sensors are used by the AV state sensing module 412 to derive the AV state. The AV state is used by the localization module and the motion control module 409.

The localization module 411 fuses together the various sources of location information and forms a measured AV pose 705. The location information includes GPS, Inertial Measurement Unit (IMU) and other such apparatus, systems and methods that provide location information. The illustrative AV pose is used by both the navigator 407 and the pilot 408 to navigate the AV along a trajectory described by the flight plan 704.

As shown in FIG. 7, the navigator 407 uses a flight plan 704 to specify an intended trajectory of the AV. Perceptive navigation provides a system and method that manages how the AV executes "follow trajectory" maneuvers specified by a flight plan. More specifically, the perceptive navigation closed loop control system determines a measured or actual AV pose from a sensor measurement of an asset feature in a frame of reference that can be an AFF, a GRF, a LCF, or RBF.

Thus, the navigations system may further include a trajectory in a flight plan, in which the coordinates of the trajectory are expressed with the frame of reference and the AFF. The perceptive navigation method may further receive a trajectory in a flight plan, at the perceptive navigation subsystem, wherein the coordinates for the trajectory are expressed with the frame of reference and the AFF. Also, the navigation system may include a trajectory in a flight plan received by the perceptive navigation system wherein the coordinates for the trajectory are expressed with the frame of reference and the AFF.

The various functions depicted in FIG. 7 are implemented as software modules on a processor that interfaces with various sensors and actuators. In FIG. 7 these software modules are depicted as operating on two separate hardware subsystems, namely, the Perceptive Navigation computer subsystem 706 and the Flight Control Unit (FCU) computer subsystem 707. The Perceptive Navigation computer subsystem 706 interfaces with the various environment sensors described herein. Each environmental sensor input perform the perceptive navigation tasks as described herein. The FCU computer system interfaces with the actuators and performs all the low-level motion control functions of the AV. The Perceptive Navigation computer subsystem exchanges information with the FCU computer subsystem.

The FCU computer subsystem 707 communicates AV state information to the Perceptive Navigation computer subsystem 707. The Perceptive Navigation computer subsystem 707 communicates motion control commands to the FCU computer subsystem 707. By way of example and not of limitation, the illustrative FCU computer subsystem 707 and the Perceptive Navigation computer subsystem 706 are associated with system controller 301, which may be embodied as one more standard processors and off-the-shelf electronics as described herein.

The perceptive navigation subsystem determines an AV positional pose based on the AV state information. The AV positional pose includes an AV position and an AV orientation in three-dimensional space. A frame of reference is associated with the AV positional pose by the perceptive navigation subsystem. The frame of reference includes a coordinate system for the AV position and the AV orientation. A localization module, corresponding to the perceptive navigation subsystem, determines the AV positional pose and the corresponding frame of reference. The environmental sensor detects a feature in an AV environment. The asset feature frame (AFF) associates the AV positional pose with the feature in the AV environment. The perceptive navigation system identifies the AFF. Also, the perceptive navigation subsystem generates a motion control command based the AV positional pose and the AFF. The motion control command is then communicated to the FCU subsystem that controls the AV movement.

In the illustrative embodiment, the AV positional pose is determined by the environmental sensor, which is associated with the perceptive navigation system. Additionally, the environmental sensor is selected from a group of sensors that consist of a camera, a navigation sensor, an inspection sensor, an asset perception sensor, a traffic sensor, a Light Detecting and Ranging sensor, a sonar sensor, a stereo camera, an infrared range sensor, an ultrasonic range sensor, a laser sensor and a RADAR sensor. In a further illustrative embodiment, a system controller is disposed on the autonomous vehicle, in which the system controller includes the FCU subsystem and the perceptive navigation system.

There are various types of asset feature frames (AFFs) depending upon how many degrees of freedom the AFF has and the geometric attributes that define the features of the AFF. The AFF sub-types can include vector to plane with no orientation (AFF-PL0), vector to plane with two-dimensional (2-D) orientation (AFF-PL2), vector to plane with 3-D orientation (AFF-PL3), vector to line with no orientation (AFF-LN0), vector to line with 3-D orientation (AFF-LN3), vector to point with no orientation (AFF-PT0), and vector to point with 3-D orientation (AFF-PT3).

Referring now to FIG. 8A, there is shown a vector frame of reference 802 perpendicular to a planar feature 801 from the AV. The position of the AV is only known to have one degree of freedom, which is the extent of the AV's distance from the planar feature 801. However, the orientation of the AV with respect to the plane is not known in this frame of reference, and thus has zero degrees of freedom in that regard. A further example of an AV coordinate within an AFF-PL0 frame of reference is the AV's altitude above ground, in which the ground is the planar feature. The AV's location in the AFF-PL0 frame of reference may be determined by using some sort of ranging sensor to determine how far away the AV is from the ground.

Referring now to FIG. 8B, there is shown the same frame of reference as in FIG. 8A, AFF-PL0, except that the orientation 803 of the AV with respect to the planar feature 801 is also known, making this the AFF-PL2 frame of reference. However, the orientation 803 is only known to two degrees of freedom. The orientation of the AV, i.e. yaw, around the vector perpendicular to the plane is not known. An exemplary AFF-PL2 frame of reference may be provided from sensors that determine both the distance to the ground and the orientation of the AV with respect to the ground. In the example, distance to the ground and the orientation of the AV with respect to the ground could be determined from a downward pointing sensor, i.e. a stereo camera, that provides a depth map from which the distance to the ground plane and the orientation of the ground plane with respect to the AV could be determined.

With reference now to FIG. 8C, there is shown the same frame of reference as in FIGS. 8A and 8B, except that the orientation of the AV with respect to the planar feature 801 is known to three degrees of freedom, making this the AFF-PL3 frame of reference. In addition to the orientation 803, the orientation of the AV around the vector perpendicular to the plane 805 is also known. An exemplary AFF-PL3 could be provided from sensors that provide both the distance to the ground and the orientation of the AV with respect to the ground. In the example, the additional orientation 805 can be determined from a pattern on the ground plane that yields an orientation to the ground plane with respect to the AV.

Referring now to FIG. 9A, there is shown a vector to line with no orientation (AFF-LN0), in which the vector of the AV is associated with a linear feature 901. In t AFF-LN0 sub-type, the vector is perpendicular to the linear feature, allowing determination of the position of the AV to only two degrees of freedom, namely the distance to the line 902 and the polar coordinate around the line 903. The orientation of the AV with respect to the line 902 is not known in this frame of reference and thus has zero degrees of freedom.

Referring now to FIG. 9B, there is shown a vector to line with 3-D orientation (AFF-LN3). In the AFF-LN3 sub-type, the same vector as in FIG. 9A is shown, except that the orientation 904 and 905 of the AV with respect to the linear feature is known to three degrees of freedom.

Referring now to FIG. 10A, there is shown the vector to point with no orientation (AFF-PT0). In the AFF-PT0 sub-type, the vector 1002 of the AV is associated with a point feature 1001. In the AFF-PT0 sub-type, the position of the AV is known to three degrees of freedom with respect to the point feature. However, the orientation of the AV with respect to the point feature is not known and has zero degrees of freedom.

Referring now to FIG. 10B, there is shown a vector to point with 3-D orientation (AFF-PT3). In the AFF-PT3 sub-type, the same vector as in FIG. 10A is shown, except that the orientation is also known to three degrees of freedom.

There may or may not be transforms between the AFFs described above and a fixed local frame (LCF). If there is a transform between an AFF and a LCF, then the features that are used to generate the location within the AFF may be fixed or static. Also, the features may be moving with respect to a LCF and so moving the transform from the AFF to the LCF is dynamic.

Referring back to FIG. 7, the act of the AV determining its position is termed "localization." When the AV employs perceptive navigation, the AV uses machine vision techniques to perceive known features of its environment to aid in the navigation process. In the illustrative embodiment, the AV operates and moves within an environment 701 that includes assets having perceivable features 703. Additionally, the AV has an actual state within the environment represented in FIG. 7 as 702.

Referring now to FIG. 11, there is shown an illustrative trajectory in a fixed geo-reference frame (GRF), in which each maneuver A through F is simply a straight-line path between GPS waypoints 1101. Perceptive navigation allows trajectories to be defined using coordinates in asset feature frames (AFFs). Additionally, perceptive navigation allows for the trajectories to be composed of multiple complimentary frames of reference.

In an illustrative embodiment, a trajectory is composed of a sequence of waypoints in a GRF that includes latitude and longitude coordinates with heading. The AV travels between waypoints using the GRF with the added constraint that the AV maintain a certain altitude above ground level associated with AGG-PL0 as described above. Thus, the AV is navigating using AFF-PL0 and the feature of interest in the AFF-PL0 is the ground. In the illustrative embodiment, when the pilot 408 executes this maneuver the AV would use two coordinates from the GRF location and one coordinate from the AFF-PL0 to navigate in 3-D space.

Regardless of the frame of reference used, the basic task in following a trajectory is to compare the AV's current pose to that of the trajectory in the appropriate frame of reference is performed. Subsequently, flight control commands are issued so that the AV's pose will match that of the trajectory as closely as possible. The trajectory following task does this iteratively, maneuver by maneuver, measured pose by measure pose, until the entire trajectory is traversed and completed.

Referring now to FIG. 12, there is shown an illustrative model of an asset that includes features A through M. Each feature of the asset model can have one or more attributes including a unique identifier, a feature type, an AFF classification, dimensions, a pose within other frames of reference, and a topological relationship to other features in the asset. Additionally, each feature of the asset can have one or more predefined paths that the AV can take when flying with respect to that feature.

Each of the paths associated with a feature must satisfy certain requirements. Firstly, under normal circumstances each path must be a safe trajectory for the AV to traverse. Secondly, each path must place the AV in an appropriate perspective to collect data concerning the asset. Thirdly, the asset feature must be in view of the AV so that the AV can continue to use the asset feature for localization purposes, except for brief periods of time. Fourthly, each path must provide sufficient connectivity with paths to adjacent features of the asset. These four requirements are intended to be non-limiting and no particular order. In FIG. 12, the paths travel through the nodal positions 1 through 12 so that features A through M will be observed, sensed, and measured by the AV traveling between the nodal positions 1 through 12.

Referring now to FIG. 13, there is shown a traversability graph (TG) representing the connectivity between asset features and an exemplary path 1304 through the TG that consists of edges E-D-I-H-G. The TG generally depicts a network of paths that the AV can traverse when moving with respect to the asset. The TG in FIG. 13 includes features such as edges 1302 and nodes 1301 that provide connections between separate features A through M. FIG. 13 shows how route planning using the TG becomes a simple graph search since the paths associated with each feature are pre-determined. In addition to nodes 1301 and edges 1302, a TG may also include entry/exit points 1303 that are predetermined locations in the TG, in which the AV can enter or exit the paths in the TG.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A navigation system for an autonomous vehicle (AV) operating in an AV environment, the navigation system comprising:
    a system controller configured to determine a fixed local frame (LCF), wherein the LCF includes a coordinate system originating at a fixed location in three-dimensional space;
    the system controller configured to determine an AV positional pose, which identifies an AV position in three-dimensional space and an AV orientation in three-dimensional space;
    the system controller configured to determine the AV positional pose within the LCF coordinate system;
    an asset moving within three-dimensional space, wherein the asset includes an asset feature;
    an environmental sensor configured to detect the asset feature;
    the system controller configured to identify an asset feature frame (AFF), wherein the AFF includes a coordinate system originating at the asset feature;
    a localization module associated with the system controller, wherein the localization module is configured to determine the AV positional pose in the coordinate system of the AFF;
    the system controller further configured to dynamically transform the AV positional pose from the LCF coordinate system to the coordinate system of the AFF; and
    wherein the system controller generates a motion control command based on the AV positional pose in the coordinate system of the AFF.

2. The navigation system of claim 1 further comprising a trajectory in a flight plan wherein the coordinates for the trajectory are expressed within at least one of the LCF and the AFF.

3. The navigation system of claim 1 wherein the asset feature includes a planar feature.

4. The navigation system of claim 1 wherein the asset feature includes a linear feature.

5. The navigation system of claim 1 wherein the asset feature includes a point feature.

6. The navigation system of claim 2 wherein the flight plan includes at least one mission objective, and wherein the system controller generates a motion control command based on the at least one mission objective and the AV positional pose in the coordinate system of the AFF.

7. A method for perceptive navigation of an automated vehicle (AV), the method comprising:
    determining, by a perceptive navigation subsystem, a fixed local frame (LCF), wherein the AV includes the perceptive navigation subsystem, and wherein the LCF includes a coordinate system originating at a fixed location in three-dimensional space;
    determining, by the perceptive navigation subsystem, an AV positional pose, which identifies an AV position in three-dimensional space and an AV orientation in three-dimensional space;
    determining, by the perceptive navigation subsystem, the AV positional pose within the LCF coordinate system;
    detecting, by the perceptive navigation subsystem, an asset moving within three-dimensional space, wherein the asset includes an asset feature;
    generating, by the perceptive navigation subsystem, an asset feature frame (AFF), wherein the AFF includes a coordinate system originating at the asset feature;
    determining, by the perceptive navigation subsystem, the AV positional pose within the coordinate system of the AFF;
    dynamically transforming, by the perceptive navigation subsystem, the AV positional pose from the LCF coordinate system to the coordinate system of the AFF; and
    generating, by the perceptive navigation subsystem, a motion control command based on the AV positional pose in the coordinate system of the AFF.

8. The perceptive navigation method of claim 7 further comprising receiving a trajectory in a flight plan, by the perceptive navigation subsystem, wherein the coordinates for the trajectory are expressed within at least one of the LCF and the AFF.

9. The perceptive navigation method of claim 7 wherein the asset feature includes a planar feature.

10. The perceptive navigation method of claim 7 wherein the asset feature includes a linear feature.

11. The perceptive navigation method of claim 7 wherein the asset feature includes a point feature.

12. The perceptive navigation method of claim 8 wherein the flight plan includes at least one mission objective, and further comprising generating, by the perceptive navigation subsystem, a motion control command based on the at least one mission objective and the AV positional pose in the coordinate system of the AFF.

13. A navigation system for an autonomous vehicle (AV), the navigation system comprising:
    a flight control unit (FCU) subsystem communicatively coupled to at least one actuator that controls an AV movement, wherein the FCU subsystem is configured to communicate a plurality of AV state information to a perceptive navigation subsystem;
    the perceptive navigation subsystem determines an AV positional pose based on the AV state information, wherein the AV positional pose includes an AV position and an AV orientation in three-dimensional space;
    a fixed local frame (LCF) that is associated with the AV positional pose by the perceptive navigation subsystem, wherein the LCF includes a coordinate system originating at a fixed location in three-dimensional space;
    an environmental sensor configured to detect a moving asset, wherein the asset includes an asset feature;
    an asset feature frame (AFF) including a coordinate system originating at the asset feature, wherein the perceptive navigation subsystem determines the AV positional pose in the coordinate system of the AFF, and wherein the perceptive navigation system identifies the AFF;
    the perceptive navigation subsystem further dynamically transforms the AV positional pose from the LCF coordinate system to the coordinate system of the AFF; and
    wherein the perceptive navigation subsystem generates a motion control command based on the AV positional pose in the coordinate system of the AFF, the motion control command communicated to the FCU subsystem that controls the AV movement.

14. The navigation system of claim 13 further comprising a trajectory in a flight plan received by the perceptive navigation system wherein the coordinates for the trajectory are expressed within at least one of the LCF and the AFF.

15. The navigation system of claim 13 wherein the AV positional pose is determined by the environmental sensor, which is associated with the perceptive navigation subsystem.

16. The navigation system of claim 13 wherein the environmental sensor is selected from at least one of a camera, a navigation sensor, an inspection sensor, an asset perception sensor, a traffic sensor, a Light Detecting and Ranging sensor, a sonar sensor, a stereo camera, an infrared range sensor, an ultrasonic range sensor, a laser sensor and a RADAR sensor.

17. The navigation system of claim 13 further comprising a system controller disposed on the autonomous vehicle, wherein the system controller includes the FCU subsystem and the perceptive navigation subsystem.

18. The navigation system of claim 13 wherein the asset feature includes a planar feature.

19. The navigation system of claim 13 wherein the asset feature includes a linear feature.

20. The navigation system of claim 14 wherein the flight plan includes at least one mission objective, and wherein the perceptive navigation subsystem generates a motion control command based on the at least one mission objective and the AV positional pose in the coordinate system of the AFF.

* * * * *